US012450966B2

(12) United States Patent
Kawase

(10) Patent No.: US 12,450,966 B2
(45) Date of Patent: Oct. 21, 2025

(54) INFORMATION PROCESSING APPARATUS, INFORMATION PROCESSING METHOD, AND STORAGE MEDIUM

(71) Applicant: NEC Corporation, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 546 days.

(21) Appl. No.: 17/909,646

(22) PCT Filed: Mar. 31, 2020

(86) PCT No.: PCT/JP2020/014923
§ 371 (c)(1),
(2) Date: Sep. 6, 2022

(87) PCT Pub. No.: WO2021/199337
PCT Pub. Date: Oct. 7, 2021

(65) Prior Publication Data
US 2023/0106240 A1    Apr. 6, 2023

(51) Int. Cl.
G06K 9/00         (2022.01)
G06Q 10/02        (2012.01)
(Continued)

(52) U.S. Cl.
CPC .............. G07C 9/37 (2020.01); G06Q 10/02 (2013.01); G06V 40/172 (2022.01)

(58) Field of Classification Search
CPC . G07C 9/37; G07C 9/27; G07C 9/257; G06V 40/172; G06Q 10/02; G07B 15/00
See application file for complete search history.

(56) References Cited

U.S. PATENT DOCUMENTS

2003/0149343 A1*  8/2003  Siegel ................... G07C 9/257
                                                    600/300
2004/0064415 A1*  4/2004  Abdallah ................ G07C 9/27
                                                    705/50
(Continued)

FOREIGN PATENT DOCUMENTS

CN    107909683 A    4/2018
JP    H10-188056 A   7/1998
(Continued)

OTHER PUBLICATIONS

Extended European Search Report for EP Application No. EP20928240.9 dated on Apr. 5, 2023.
(Continued)

Primary Examiner — Avinash Yentrapati
(74) Attorney, Agent, or Firm — Sughrue Mion, PLLC

(57) ABSTRACT

An information processing apparatus according to the present invention includes: a matching unit that has a first mode to match biometric information on a user acquired at a first gate of a plurality of boarding gates with a first group of registered biometric information on an expected passenger related to the first gate and a second mode to match the biometric information with a second group of registered biometric information on all expected passengers related to the plurality of boarding gates; and a control unit that, when a matching result in the first mode is that the matching is successful, permits the user to pass through the first gate, and when a matching result in the second mode is that the matching is successful, outputs guide information that guides the user to a second gate associated with registered biometric information which successfully matches the biometric information out of the second group of registered biometric information.

15 Claims, 20 Drawing Sheets

(51) Int. Cl.
*G06V 40/16* (2022.01)
*G07C 9/37* (2020.01)

(56) References Cited

U.S. PATENT DOCUMENTS

| | | | |
|---|---|---|---|
| 2004/0169076 A1* | 9/2004 | Beale | G07C 9/257 |
| | | | 235/382 |
| 2004/0190757 A1* | 9/2004 | Murphy | G07B 15/00 |
| | | | 340/5.83 |
| 2008/0030300 A1* | 2/2008 | Naito | G06Q 30/02 |
| | | | 340/5.1 |
| 2012/0200390 A1* | 8/2012 | Saravanan | G07C 9/27 |
| | | | 340/5.61 |
| 2017/0070501 A1* | 3/2017 | Saito | G06V 40/161 |
| 2017/0372541 A1* | 12/2017 | Attar | G07C 9/257 |
| 2020/0042812 A1* | 2/2020 | Sakaguchi | G06V 40/172 |
| 2020/0043118 A1 | 2/2020 | Sakaguchi et al. | |
| 2021/0056655 A1* | 2/2021 | Norimatsu | G06V 40/1365 |
| 2023/0106240 A1 | 4/2023 | Kawase | |

FOREIGN PATENT DOCUMENTS

| | | |
|---|---|---|
| JP | 2001-331605 A | 11/2001 |
| JP | 2002-163691 A | 6/2002 |
| JP | 2007-079656 A | 3/2007 |
| JP | 2017-010269 A | 1/2017 |
| JP | 7327651 B2 | 8/2023 |
| WO | 2012/073301 A1 | 6/2012 |
| WO | 2020/026367 A1 | 2/2020 |

OTHER PUBLICATIONS

International Search Report for PCT Application No. PCT/JP2020/014923, mailed on Jun. 23, 2020.

JP Office Action for JP Application No. 2023-126700, mailed on Jul. 9, 2024 with English Translation.

* cited by examiner

FIG. 2

| No | ITEM NAME |
|---|---|
| 1 | RESERVATION NUMBER |
| 2 | FLIGHT NUMBER |
| 3 | AIRLINE CODE |
| 4 | PASSENGER NAME |
| 5 | DEPARTURE PLACE |
| 6 | DESTINATION |
| 7 | FLIGHT DATE |
| 8 | SEAT NUMBER |
| 9 | NATIONALITY |
| 10 | PASSPORT NUMBER |
| 11 | FAMILY NAME |
| 12 | FIRST NAME |
| 13 | DATE OF BIRTH |
| 14 | SEXUALITY |

FIG. 3

| No | ITEM NAME |
|---|---|
| 1 | USER ID |
| 2 | REGISTERED FACE IMAGE |
| 3 | FEATURE AMOUNT |
| 4 | PASSENGER NAME |
| 5 | RESERVATION NUMBER |
| 6 | DEPARTURE PLACE |
| 7 | DESTINATION |
| 8 | FLIGHT DATE |
| 9 | AIRLINE CODE |
| 10 | FLIGHT NUMBER |
| 11 | SEAT NUMBER |
| 12 | NATIONALITY |
| 13 | PASSPORT NUMBER |
| 14 | FAMILY NAME |
| 15 | FIRST NAME |
| 16 | DATE OF BIRTH |
| 17 | SEXUALITY |
| 18 | STATUS |

FIG. 4

| No | ITEM NAME |
|----|-----------|
| 1  | FLIGHT NUMBER |
| 2  | AIRLINE CODE |
| 3  | PASSENGER NAME |
| 4  | DEPARTURE PLACE |
| 5  | DESTINATION |
| 6  | ESTIMATED TIME OF DEPARTURE |
| 7  | BOARDING GATE ID |
| 8  | REGISTERED FACE IMAGE |
| 9  | FEATURE AMOUNT |
| 10 | RESERVATION NUMBER |

FIG. 5

| No | ITEM NAME |
|---|---|
| 1 | FLIGHT NUMBER |
| 2 | AIRLINE CODE |
| 3 | PASSENGER NAME |
| 4 | DEPARTURE PLACE |
| 5 | DESTINATION |
| 6 | ESTIMATED TIME OF DEPARTURE |
| 7 | REGISTERED FACE IMAGE |
| 8 | FEATURE AMOUNT |
| 9 | RESERVATION NUMBER | ived
INFORMATION PROCESSING APPARATUS, INFORMATION PROCESSING METHOD, AND STORAGE MEDIUM This application is a National Stage Entry of PCT/JP2020/014923 filed on Mar. 31, 2020, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses a ticketless boarding system to perform procedures through face authentication at a plurality of check points (a check-in lobby, a security inspection site, a boarding gate, and the like) by using biometric information on a passenger (face image).

CITATION LIST

Patent Literature

PTL 1: Japanese Patent Application Laid-Open No. 2007-79656

SUMMARY OF INVENTION

Technical Problem

In the boarding system using biometric authentication as disclosed in Patent Literature 1, a user may try to pass through a boarding gate that is different from an available boarding gate. In such a case, passage by the user will be refused. In the current system, however, it is difficult for the user on refusal of passage at a certain boarding gate to quickly determine which boarding gate to go to out of a number of boarding gates.

Accordingly, in view of the problem described above, the present invention intends to provide an information processing apparatus, an information processing method, and a storage medium that can guide a user to the appropriate boarding gate.

Solution to Problem

According to one example aspect of the present invention, provided is an information processing apparatus including: a matching unit that has a first mode to match biometric information on a user acquired at a first gate of a plurality of boarding gates with a first group of registered biometric information on an expected passenger related to the first gate and a second mode to match the biometric information with a second group of registered biometric information on all expected passengers related to the plurality of boarding gates; and a control unit that, when a matching result in the first mode is that the matching is successful, permits the user to pass through the first gate, and when a matching result in the second mode is that the matching is successful, outputs guide information that guides the user to a second gate associated with registered biometric information which successfully matches the biometric information out of the second group of registered biometric information.

According to another example aspect of the present invention, provided is an information processing method including: performing a first mode to match biometric information on a user acquired at a first gate of a plurality of boarding gates with a first group of registered biometric information on an expected passenger related to the first gate; performing a second mode to match the biometric information with a second group of registered biometric information on all expected passengers related to the plurality of boarding gates; and when a matching result in the first mode is that the matching is successful, permitting the user to pass through the first gate, and when a matching result in the second mode is that the matching is successful, outputting guide information that guides the user to a second gate associated with registered biometric information which successfully matches the biometric information out of the second group of registered biometric information.

According to yet another example aspect of the present invention, provided is a storage medium storing a program that causes a computer to perform: performing a first mode to match biometric information on a user acquired at a first gate of a plurality of boarding gates with a first group of registered biometric information on an expected passenger related to the first gate; performing a second mode to match the biometric information with a second group of registered biometric information on all expected passengers related to the plurality of boarding gates; and when a matching result in the first mode is that the matching is successful, permitting the user to pass through the first gate, and when a matching result in the second mode is that the matching is successful, outputting guide information that guides the user to a second gate associated with registered biometric information which successfully matches the biometric information out of the second group of registered biometric information.

According to yet another example aspect of the present invention, provided is an information processing apparatus including: a matching unit that matches biometric information on a user acquired by a display terminal with registered biometric information related to a person boarding a vehicle from a boarding gate; and a control unit that causes the display terminal to display information indicating a change of the boarding gate when change information on the boarding gate is associated with the registered biometric information with which a result of matching of the biometric information is that the matching is successful.

Advantageous Effects of Invention

According to the present invention, it is possible to provide an information processing apparatus, an information processing method, and a storage medium that can guide a user to the appropriate boarding gate.

BRIEF DESCRIPTION OF DRAWINGS

FIG. 2 is a diagram illustrating an example of information stored in a boarding reservation information DB according to the first example embodiment.

FIG. 3 is a diagram illustrating an example of information stored in a user information DB according to the first example embodiment.

FIG. 4 is a diagram illustrating an example of information stored in a sorted-by-day passenger information DB according to the first example embodiment.

FIG. 5 is a diagram illustrating an example of information stored in a sorted-by-gate passenger information DB according to the first example embodiment.

DESCRIPTION OF EMBODIMENTS

Exemplary example embodiments of the present invention will be described below with reference to the drawings. Throughout the drawings, the same elements or corresponding elements are labeled with the same references, and the description thereof may be omitted or simplified.

First Example Embodiment

Figure 1:
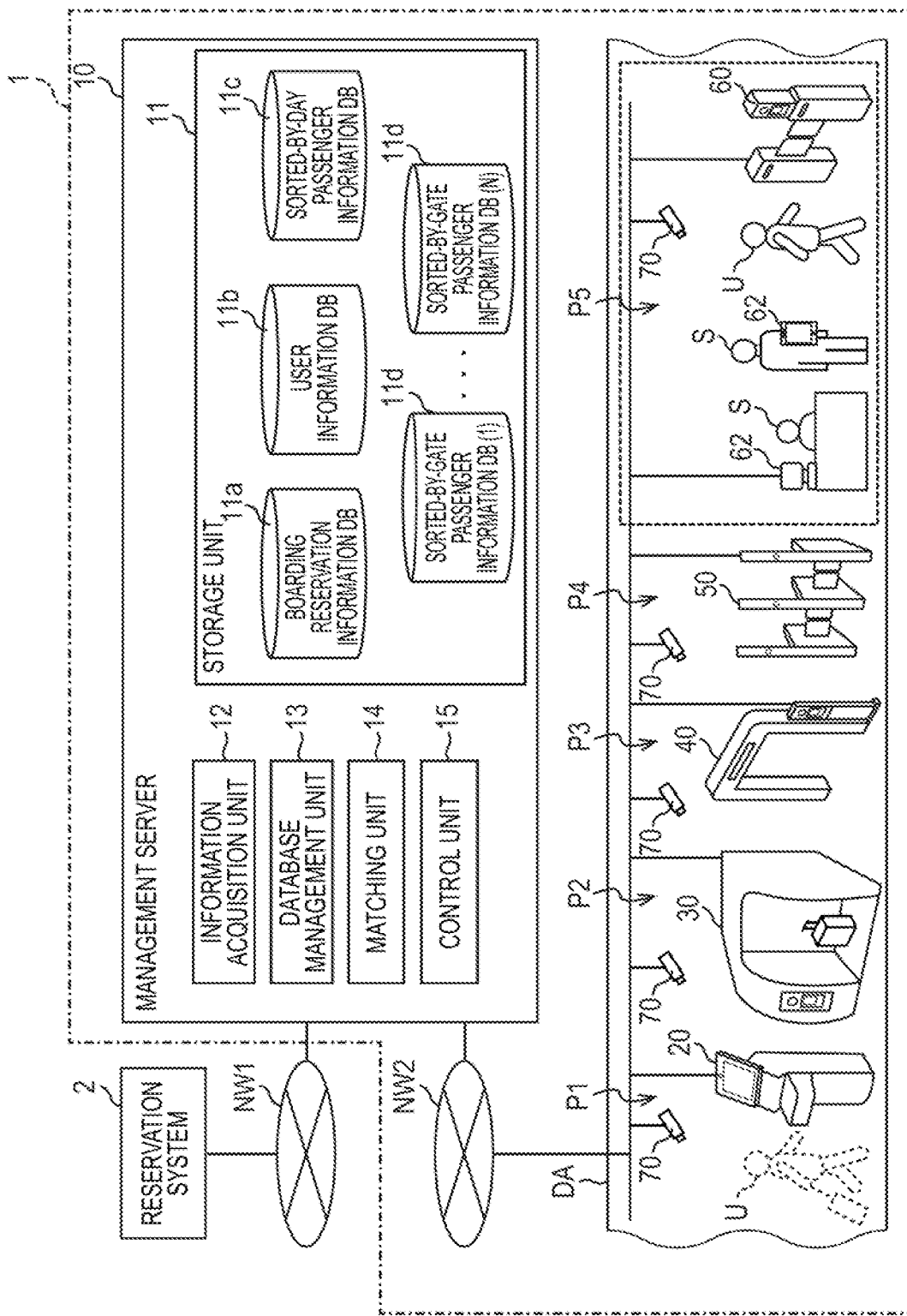
FIG. 1 is a schematic diagram illustrating an example of an overall configuration of an information processing system according to a first example embodiment.

FIG. 1 is a schematic diagram illustrating an example of the overall configuration of an information processing system 1 according to the present example embodiment. The information processing system 1 according to the present example embodiment is a computer system that supports a series of procedures performed in a first country and a second country that is different from the first country, respectively, for a user (passenger) U who is scheduled to depart the first country from an airport DA in the first country by an aircraft and enter the second country via an airport in the second country, for example. The information processing system 1 is operated by a public institution such as an immigration control bureau or a trustee entrusted with the operation from such an institution, for example.

As illustrated in FIG. 1, the information processing system 1 includes a management server 10, a check-in terminal 20, an automatic baggage check-in machine 30, a security inspection apparatus 40, an automated gate apparatus 50, a boarding gate apparatus 60, operation terminals 62, and cameras 70. The management server 10 is connected to a reservation system 2 of an airport company via a network NW1. Further, the management server 10 is connected to respective apparatuses within the airport DA via a network NW2. The networks NW1 and NW2 are each formed of a local area network (LAN), a wide area network (WAN), a mobile communication network, or the like. The connection scheme may be a wireless scheme without being limited to a wired scheme.

The management server 10 is an information processing apparatus that manages various inspection procedures when the user U enters or departs the country. The management server 10 is installed in a facility of an airport company, an airline company, or the like operating the airport DA, for example. Note that the management server 10 is not necessarily required to be a single server and may be configured as a group of servers including a plurality of servers. For example, a server responsible for some of the functions of the management server 10 may be installed in the first country, and another server responsible for the remaining functions of the management server 10 may be installed in the second country.

The management server 10 includes a storage unit 11, an information acquisition unit 12, a database management unit 13, a matching unit 14, and a control unit 15.

The storage unit 11 stores information used in each unit of the management server 10. For example, the storage unit 11 includes a boarding reservation information DB 11a, a user information DB 11b, a sorted-by-day passenger information DB 11c, and sorted-by-gate passenger information DBs 11d.

The boarding reservation information DB 11a is a database that aggregates and stores boarding reservation information transmitted from reservation systems 2 of the airline companies, respectively.

FIG. 2 is a diagram illustrating an example of information stored in the boarding reservation information DB 11a. The boarding reservation information DB 11a has data items of a reservation number, a flight number, an airline code, a passenger name, a departure place, a destination, a flight date, a seat number, a nationality, a passport number, a family name, a first name, a date of birth, and a sexuality. Note that these data items are examples, and other data items may be further included. The reservation number is an identifier that uniquely identifies boarding reservation information. The airline code is an identifier that uniquely identifies an airline company.

The user information DB 11b is a database that stores information on the user U who has completed a check-in procedure.

FIG. 3 is a diagram illustrating an example of information stored in the user information DB 11b. The user information DB 11b has data items of a user ID, a registered face image, a feature amount, a passenger name, a reservation number, a departure place, a destination, a flight date, an airline code, a flight number, a seat number, a nationality, a passport number, a family name, a first name, a date of birth, a sexuality, and status. Note that these data items are examples, and other data items may be further included.

The user ID is an identifier that uniquely identifies the user U. In the present example embodiment, the user ID is issued provided that a result of matching between a face image obtained by capturing the user U having a passport in a check-in procedure and a passport face image read from the passport is that the matching is successful. In the present example embodiment, the expression "matching is successful" means that a matching score indicating a similarity between biometric information on the user U and registered biometric information on a registrant is greater than or equal to a predetermined threshold. Further, the expression "matching is unsuccessful" means that a matching score is less than the predetermined threshold.

The registered face image is a face image registered for the user U. In the present example embodiment, the registered face image is registered during a check-in procedure. The registered face image may be registered in a procedure operation that is first performed out of a series of procedure operations performed when departing a country. It is preferable that a registered face image be registered based on consent from the user U and then deleted at a predetermined time. The feature amount is a value extracted from biometric information (registered face image).

The registered face image in the present example embodiment is registered, in the same manner as the user ID, provided that a result of matching between a face image obtained by capturing the user U having a passport in the first procedure operation (check-in procedure) and a passport face image read from the passport is that the matching is successful.

Further, as the registered face image, a face image captured in the first procedure operation at the place is used. The reason therefor is that a face image captured in the first procedure operation is newer than a passport face image and that the quality (appearance) is closer to an image captured in a subsequent authentication process than the passport face image. Instead of a target face image (captured face image), however, a passport face image may be set as a registered face image (registered biometric information).

The management server 10 matches face images (biometric information) captured at the automatic baggage check-in machine 30, the security inspection apparatus 40, the automated gate apparatus 50, and the boarding gate apparatus 60 with registered face images stored in the user information DB 11b, respectively, and thereby performs identity verification as to whether or not the user U is a person who possesses an appropriate boarding thicket. The details will be described later.

Note that, although the term of biometric information in the present example embodiment means a face image and a feature amount extracted from the face image, biometric information is not limited to a face image and a face feature amount. That is, biometric authentication may be performed by using an iris image, a fingerprint image, a palmprint image, an auricle image, or the like as the biometric information on the user U.

The sorted-by-day passenger information DB 11c is a database that stores passenger information on a scheduled flight date (flight date) basis. The sorted-by-day passenger information DB 11c stores information on all the users (expected passengers) U who are expected to pass through any of a plurality of boarding gates in the airport DA and then board an aircraft.

FIG. 4 is a diagram illustrating an example of information stored in the sorted-by-day passenger information DB 11c. The sorted-by-day passenger information DB 11c has data items of a flight number, an airline code, a passenger name, a departure place, a destination, an estimated time of departure, a boarding gate ID, a registered face image, a feature amount, and a reservation number. Note that these data items are examples, and other data items may be further included. The boarding gate ID is identification information that uniquely identifies a boarding gate.

Each sorted-by-gate passenger information DB 11d is a database that stores passenger information on a boarding gate basis. In the present example embodiment, sorted-by-gate passenger information DBs 11d are provided in association with boarding gates at N points, respectively.

FIG. 5 is a diagram illustrating an example of information stored in the sorted-by-gate passenger information DB 11d. The sorted-by-gate passenger information DB 11d has data items of a flight number, an airline code, a passenger name, a departure place, a destination, an estimated time of departure, a registered face image, a feature amount, and a reservation number. Note that these data items are examples, and other data items may be further included.

The information acquisition unit 12 acquires information from the reservation system 2 and apparatuses at respective touch points. The database management unit 13 performs a registration process, an update process, and a searching process on the databases of the storage unit 11.

The matching unit 14 performs at least one of matching processes performed in a first mode, which is to match biometric information on the user U acquired at a first gate of a plurality of boarding gates with a first group of registered biometric information on an expected passenger related to the first gate, and a second mode, which is to match biometric information on the user U with a second group of registered biometric information on all the expected passengers related to the plurality of boarding gates. In the present example embodiment, the first group of registered biometric information corresponds to a plurality of face images stored in the sorted-by-gate passenger information DB 11d. Further, the second group of registered biometric information corresponds to a plurality of face images stored in the sorted-by-day passenger information DB 11c.

The control unit 15 permits the user to pass through the first gate if the matching result in the first mode is that the matching is successful, and the control unit 15 outputs guide information that guides the user to the second gate associated with registered biometric information which successfully matches biometric information out of the second group of registered biometric information if the matching result in the second mode is that the matching is successful.

The check-in terminal 20 is installed in a check-in lobby or a check-in counter within the airport DA of the first country (departure country). Hereafter, a procedure area where the check-in terminal 20 is installed is referred to as "touch point P1". The check-in terminal 20 is a self-service terminal used by the user U to operate it by himself/herself to perform a check-in procedure (boarding procedure). After completion of a check-in procedure at the touch point P1, the user U moves to a baggage check-in place or a security inspection site.

The automatic baggage check-in machine 30 is installed in a region adjacent to a baggage check-in counter (manned counter) or a region near the check-in terminal 20 within the airport DA. Hereafter, a procedure area where the automatic baggage check-in machine 30 is installed is referred to as "touch point P2". The automatic baggage check-in machine 30 is a self-service terminal used by the user U to operate it by himself/herself to perform a procedure of checking in baggage that is not carried in or is not allowed to be carried in a passenger cabin. After completion of a baggage check-in procedure, the user U moves to the security inspection site. In a case of the user U having no baggage to check in, the procedure at the touch point P2 is omitted.

The security inspection apparatus 40 is installed in a security inspection site within the airport DA (hereafter, referred to as "touch point P3"). The term "security inspection apparatus" in the present example embodiment is used as a meaning including all of a metal detector that checks whether or not the user U is wearing a metal object that can be a dangerous article by using a metal detector, an X-ray inspection apparatus that uses X-ray to check whether or not there is a dangerous article in carry-on baggage or the like, a passage control apparatus that determines whether or not to permit passage of the user U at the entrance or exit of the security inspection site, or the like. After completion of a security inspection procedure performed by the security inspection apparatus 40 at the touch point P3, the user U moves to the immigration site.

The automated gate apparatus 50 is installed in the immigration site within the airport DA (hereafter, referred to as "touch point P4"). The automated gate apparatus 50 is an apparatus that automatically performs an immigration procedure for the user U. After completion of the immigration procedure at the touch point P4, the user U moves to a departure area where duty-free shops or boarding gates are provided.

The boarding gate apparatus 60 is a gate apparatus installed for each boarding gate (hereafter, referred to as "touch point P5") in the departure area. The boarding gate apparatus 60 confirms that the user U is a passenger for an aircraft that is available for boarding through the boarding gate. After completion of the procedure at the touch point P5, the user U boards the aircraft and departs the country to the second country.

Each operation terminal 62 is a terminal used by a staff member S of an airline company or the like for operation at the touch point P5. The operation terminal 62 is a personal computer, a tablet terminal, a smartphone, or the like, for example. Note that, although only the operation terminal 62 used by the staff member S deployed at the touch point P5 is depicted for simplified illustration in the present example embodiment, such operation terminals are installed similarly at other touch points P1 to P4.

Each camera 70 is a digital camera, for example, and is installed at respective touch points P1 to P5. For example, the camera 70 is attached to a ceiling, a wall, a pillar, or the like so that the camera 70 can capture the face or the entire body of the user U. The type of the camera 70 may be stationary or movable. The camera 70 sequentially transmits captured images to the management server 10. The management server 10 can use captured images for the purpose of face authentication of the user U, monitoring within the airport DA, or the like.

Next, the hardware configuration example of each device forming the information processing system 1 will be described with reference to the drawings. Note that, since devices that are the same in the name and differ only in the reference in FIG. 6 and FIG. 7 are devices having substantially the same function, the detailed description thereof will be omitted in the subsequent drawings.

Figure 6:
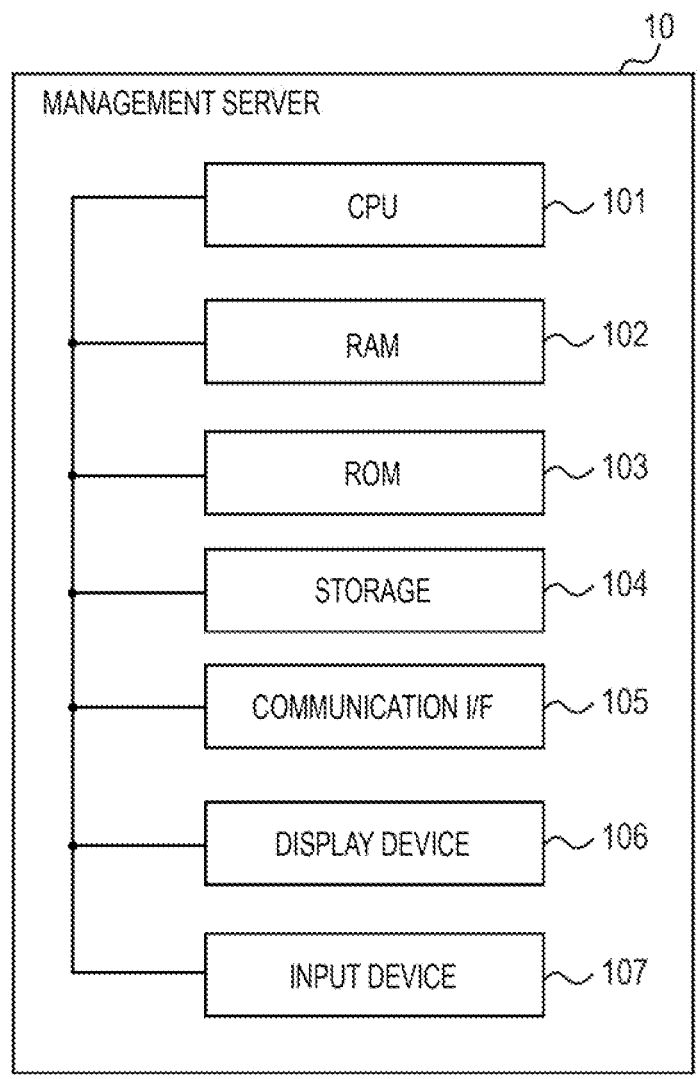
FIG. 6 is a block diagram illustrating an example of a hardware configuration of a management server according to the first example embodiment.
Figure 7:
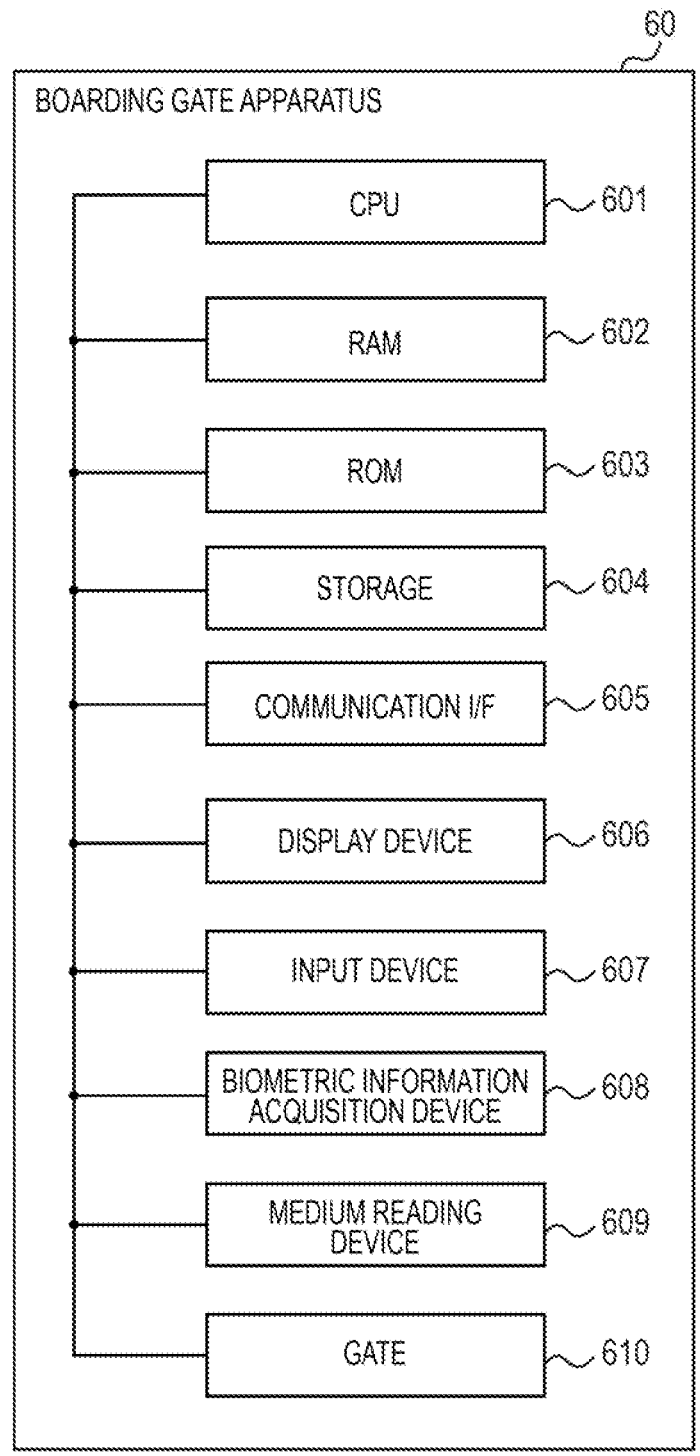
FIG. 7 is a block diagram illustrating an example of a hardware configuration of a boarding gate apparatus according to the first example embodiment.

FIG. 6 is a block diagram illustrating an example of the hardware configuration of the management server 10. As illustrated in FIG. 6, the management server 10 includes a central processing unit (CPU) 101, a random access memory (RAM) 102, a read only memory (ROM) 103, a storage 104, a communication interface (I/F) 105, a display device 106, and an input device 107 as a computer that performs calculation, control, and storage. Respective devices are connected to each other via a bus, a wiring, a drive device, or the like.

The CPU 101 is a processor having functions of performing a predetermined operation in accordance with a program stored in the ROM 103 or the storage 104 and controlling each unit of the management server 10. The RAM 102 is formed of a volatile storage medium and provides a temporary memory area required for the operation of the CPU 101.

The ROM 103 is formed of a nonvolatile storage medium and stores necessary information such as a program used for the operation of the management server 10. The storage 104 is formed of a nonvolatile storage medium and stores a program used for operating the management server 10 and data. The storage 104 is formed of a hard disk drive (HDD) or a solid state drive (SSD), for example.

The communication I/F 105 is a communication interface based on a specification such as Ethernet (registered trademark), Wi-Fi (registered trademark), 4G, or the like and is a module used for communicating with another device.

The display device 106 is a liquid crystal display, an organic light emitting diode (OLED) display, or the like used for displaying a moving image, a still image, a text, or the like and is used for presenting information to the user.

The input device 107 is a keyboard, a pointing device, a button, or the like and accepts a user operation. The display device 106 and the input device 107 may be integrally formed as a touch panel.

The CPU 101 loads a program stored in the ROM 103, the storage 104, or the like into the RAM 102 and executes the program to perform a predetermined calculation process. Further, based on the program, the CPU 101 controls each unit of the management server 10, such as the communication I/F 105. With the above components, the CPU 101 implements the functions of the storage unit 11, the information acquisition unit 12, the database management unit 13, the matching unit 14, the control unit 15, or the like.

FIG. 7 is a block diagram illustrating an example of the hardware configuration of the boarding gate apparatus 60. As illustrated in FIG. 7, the boarding gate apparatus 60 includes a CPU 601, a RAM 602, a ROM 603, a storage 604, a communication I/F 605, a display device 606, an input device 607, a biometric information acquisition device 608, a medium reading device 609, and a gate 610. Respective devices are connected to each other via a bus, a wiring, a drive device, or the like.

The biometric information acquisition device 608 is a device that acquires a face image of the user U as biometric information on the user U. The biometric information acquisition device 608 is a digital camera that captures a face of the user U standing in front of the boarding gate apparatus 60, for example, and captures the face of the user U and acquires the face image thereof.

The medium reading device 609 is a device that reads information stored in a medium carried by the user U. The medium reading device 609 may be, for example, a code reader, an image scanner, a contactless integrated circuit (IC)

reader, an optical character reader (OCR) device, or the like. Further, a recording medium may be, for example, a paper airline ticket, a mobile terminal displaying a receipt of an e-ticket, or the like.

The gate 610 transitions from a closed state for a standby period to block passage of the user U to an open state to permit passage of the user U when identity verification of the user U at the boarding gate apparatus 60 is successful. The scheme of the gate 610 is not particularly limited and may be, for example, a flapper gate in which one or more flappers provided to one side or both sides of a passage are opened and closed, a turn style gate in which three bars are revolved, or the like.

Note that the hardware configuration illustrated in FIG. 6 and FIG. 7 is an example, a device other than the above may be added, or some of the devices may not be provided. Further, some of the devices may be replaced with another device having substantially the same function. Further, some function in the present example embodiment may be provided by another device via the network NW, or the functions in the present example embodiment may be distributed to a plurality of devices and implemented therein. In such a way, the hardware configuration illustrated in FIG. 6 and FIG. 7 can be changed as appropriate.

Next, the operation of the apparatuses in the information processing system 1 according to the present example embodiment will be described with reference to the drawings.

[Acquisition Process for Boarding Reservation Information]

Figure 8:
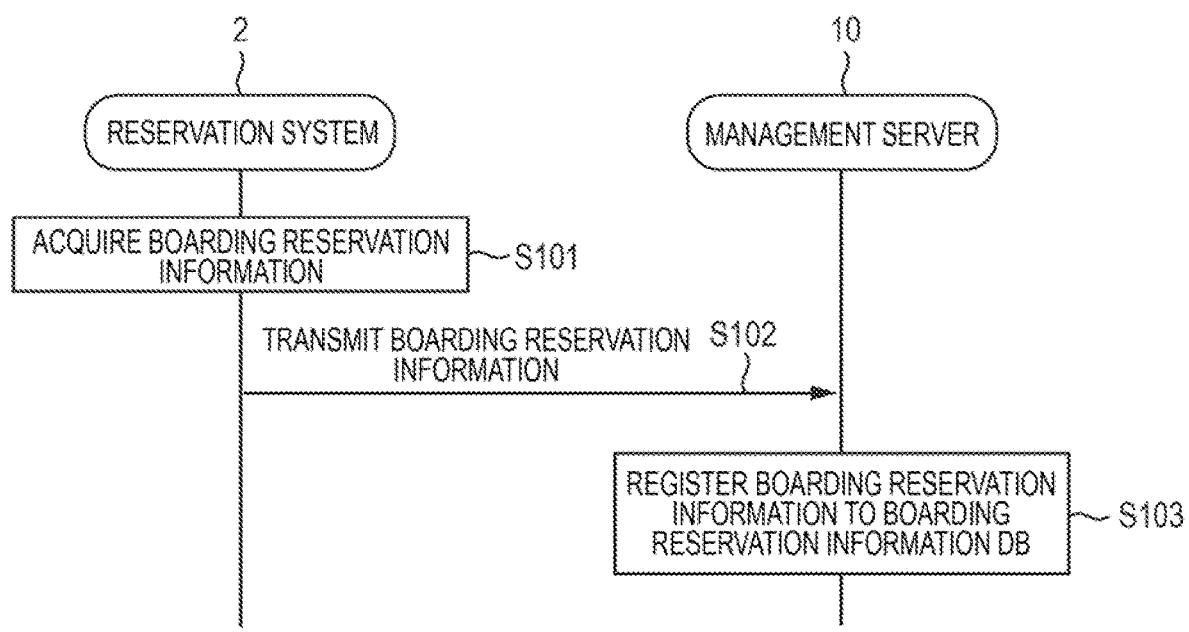
FIG. 8 is a sequence chart illustrating an example of an acquisition process for boarding reservation information in the information processing system according to the first example embodiment.

FIG. 8 is a sequence chart illustrating an example of an acquisition process of boarding reservation information in the information processing system 1. This process is performed between the reservation system 2 of the airline company and the management server 10.

First, in response to acquiring boarding reservation information on a flight basis (step S101), the reservation system 2 of the airline company transmits the boarding reservation information to the management server 10 (step S102).

In response to receiving the boarding reservation information from the reservation system 2, the management server 10 registers the boarding reservation information to the boarding reservation information DB 11a (step S103).

The process of step S101 to step S103 is performed every time boarding reservation information is transmitted to the management server 10 from the reservation system 2 of each airline company. Accordingly, boarding reservation information for a plurality of airline companies is unitarily stored in the boarding reservation information DB 11a.

[Registration Process to Sorted-by-Day Passenger Information DB]

Figure 9:
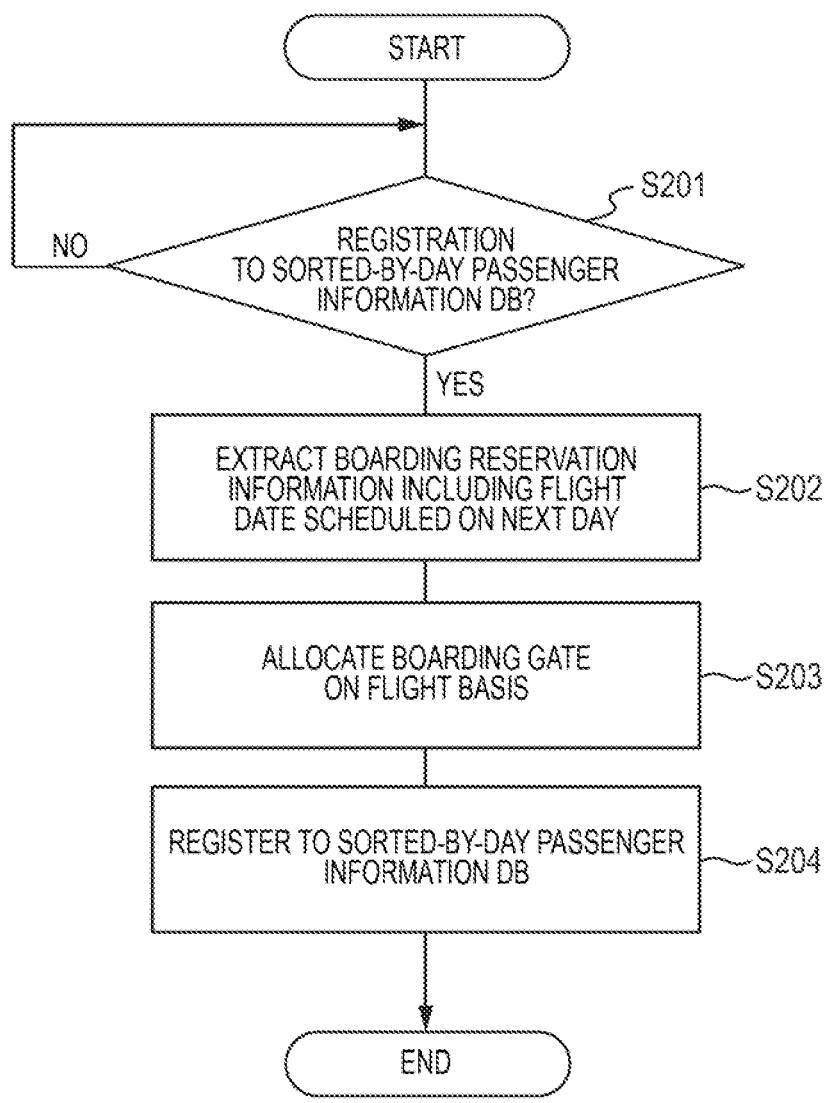
FIG. 9 is a flowchart illustrating an example of a registration process to the sorted-by-day passenger information DB in the management server according to the first example embodiment.

FIG. 9 is a flowchart illustrating an example of a registration process to the sorted-by-day passenger information DB 11c in the management server 10. For example, this process is performed everyday based on a predetermined time in the management server 10. A case of generating the sorted-by-day passenger information DB 11c that stores boarding reservation information on the next day at the end of the day will be described with FIG. 9.

First, the management server 10 determines whether or not the current time is the time to perform a registration process to the sorted-by-day passenger information DB 11c (step S201).

Herein, if the management server 10 determines that the current time is the time to perform a registration process (step S201, YES), the process proceeds to step S202. In contrast, if the management server 10 determines that the current time is not the time to perform a registration process (step S201, NO), the standby state is maintained.

Next, from the boarding reservation information DB 11a, the management server 10 extracts boarding reservation information in which a scheduled flight date is the next day (step S202).

Next, the management server 10 allocates boarding gates on a flight basis for the boarding reservation information extracted in step S202 (step S203).

The management server 10 then registers, to the sorted-by-day passenger information DB 11c, the boarding reservation information in which boarding gates are allocated on a flight basis (step S204) and ends the process. Accordingly, the sorted-by-day passenger information DB 11c that manages information on passengers (passenger information) related to all the aircrafts scheduled for flights on the next day is generated.

[Check-In Procedure]

Figure 10:
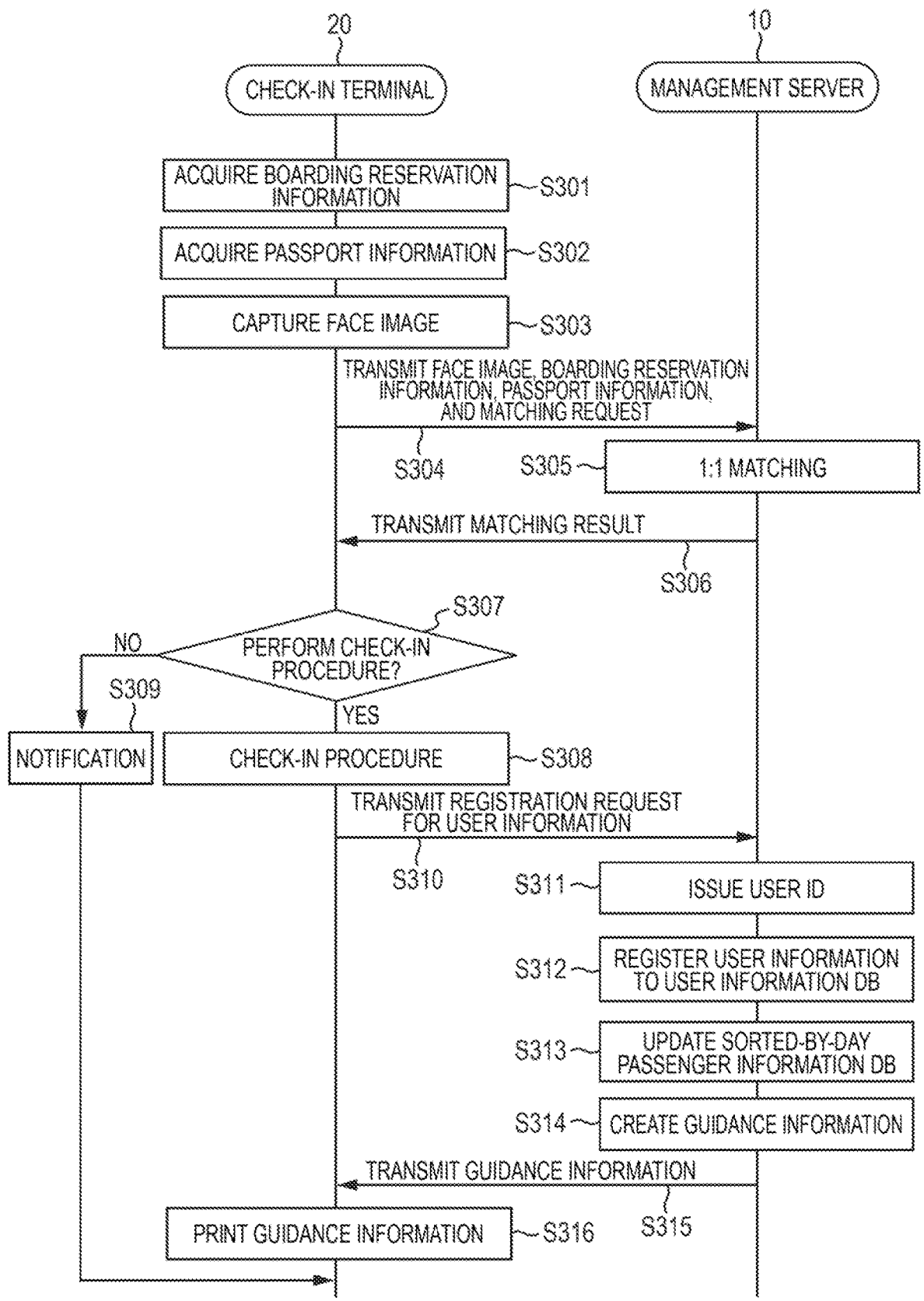
FIG. 10 is a sequence chart illustrating an example of a process during a check-in procedure in the information processing system according to the first example embodiment.

FIG. 10 is a sequence chart illustrating an example of a process during a check-in procedure in the information processing system 1. This process is performed when the user U uses the check-in terminal 20 to perform a check-in procedure.

First, once an airline ticket medium such as a boarding ticket is held over the reading unit of the medium reading device (not illustrated), the check-in terminal 20 acquires boarding reservation information on the user U from the airline ticket medium (step S301).

Next, once a passport is held over the reading unit of the medium reading device (not illustrated), the check-in terminal 20 acquires passport information on the user U from the passport (step S302). The acquired passport information includes a passport face image of the user U, identity verification information, a passport number, information on a passport issuance country, or the like.

Next, the check-in terminal 20 captures the face of the user U by using a biometric information acquisition device (not illustrated) (step S303) and transmits the face image, the boarding reservation information, the passport information, and a matching request to the management server 10 (step S304). Note that it is preferable that the check-in terminal 20 display a screen for obtaining consent from the user U before capturing the face image.

In response to receiving information from the check-in terminal 20, the management server 10 matches a face image captured by the check-in terminal 20 (hereafter, referred to as a "target face image") with a face image recorded in the passport of the user U (hereafter, referred to as a "passport face image") in a one-to-one manner (step S305).

Next, the management server 10 transmits a matching result of a process of matching between the target face image and the passport face image to the check-in terminal 20 (step S306).

Next, based on a matching result received from the management server 10, the check-in terminal 20 determines whether or not a check-in procedure of the user U is ready to be performed (step S307).

Herein, if the matching result received from the management server 10 is that the matching is successful and the check-in terminal 20 thus determines that a check-in procedure of the user U is ready to be performed (step S307, YES), the process proceeds to step S308.

In contrast, if the matching result received from the management server 10 is that the matching is unsuccessful and the check-in terminal 20 thus determines that a check-in procedure of the user U is not ready to be performed (step S307, NO), the check-in terminal 20 notifies the user U of an error message (step S309). The process then ends.

In step S308, the check-in terminal 20 performs a check-in procedure such as confirmation of an itinerary, selection of a seat, or the like based on an input operation made by the user U. Next, the check-in terminal 20 transmits a registration request for user information to the management server 10 (step S310). The registration request includes status information indicating that a check-in procedure is completed, a reservation number that identifies boarding reservation information, or the like.

Next, in response to receiving a registration request from the check-in terminal 20, the management server 10 issues a user ID (step S311). The user ID is set to a unique value based on a date and time at processing or a sequence number, for example.

Next, the management server 10 registers, to the user information DB 11b, user information in which a target face image is used as a registered face image (step S312). The user information includes boarding reservation information and passport information.

Next, the management server 10 updates the sorted-by-day passenger information DB 11c by using, as a key, the reservation number included in the user information registered in the user information DB 11b (step S313). Specifically, the face image of the user U, the user ID, or the like are added to the passenger information in the sorted-by-day passenger information DB 11c.

Next, the management server 10 creates guidance information for the user U based on the passenger information in the sorted-by-day passenger information DB 11c (step S314). Next, the management server 10 transmits the guidance information to the check-in terminal 20 (step S315). The guidance information includes a flight name (flight number) of an aircraft to board, an estimated time of departure, and a currently allocated boarding gate number.

Then, in response to receiving the guidance information from the management server 10, the check-in terminal 20 prints the guidance information on a boarding ticket (step S316) and ends the process. The user U is able to determine the currently allocated boarding gate by referencing the guidance information printed on the boarding ticket. Note that the boarding ticket and the guidance information may be provided to the user U through a method other than printing on a paper medium. For example, the boarding ticket and the guidance information may be provided to the user U as an electronic ticket to an application or the like of a smartphone possessed by the user U.

In the present example embodiment, the reason why a face image captured at the place (target face image) is used as the registered face image is that a captured image has quality (appearance) closer to an image captured in a subsequent authentication process than a passport face image, or the like. Instead of a target face image (captured face image), however, a passport face image may be set as a registered face image (registered biometric information).

[Registration Process to Sorted-by-Gate Passenger Information DB 11d]

Figure 11:
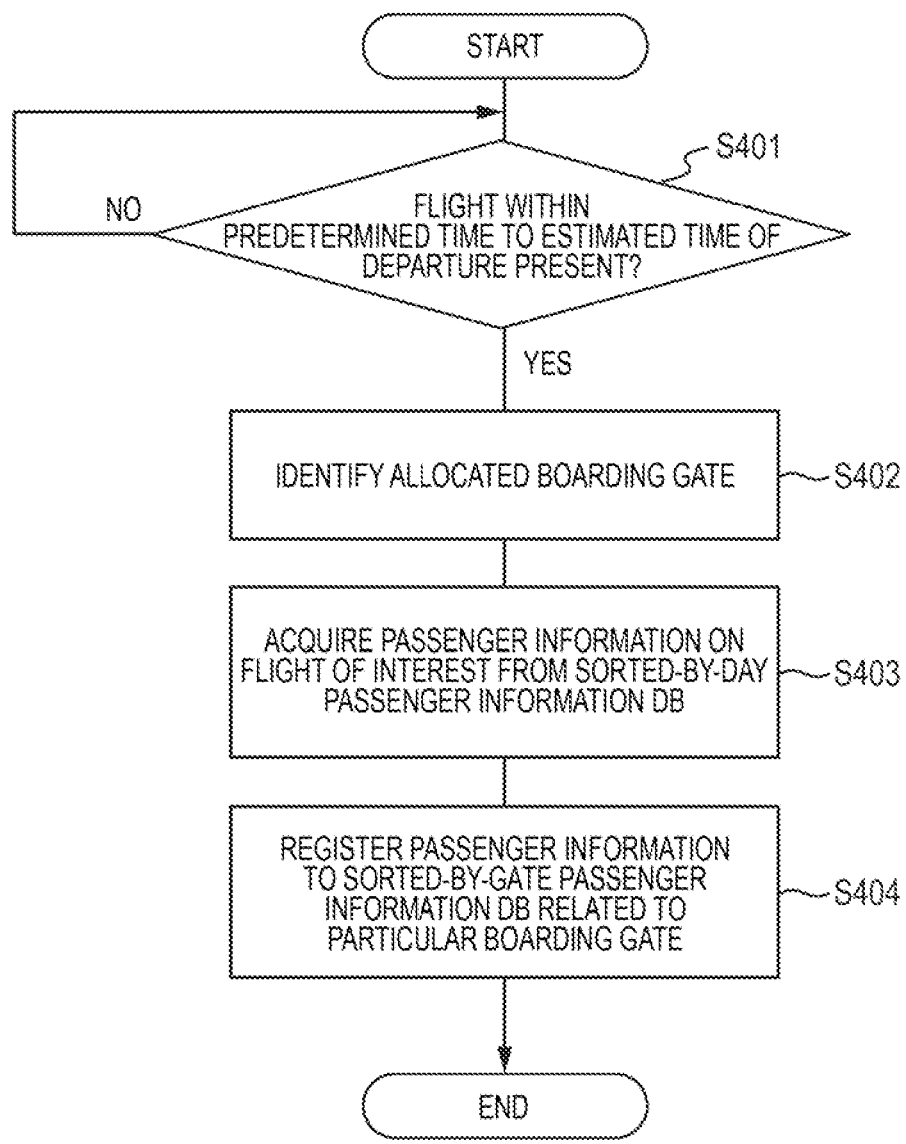
FIG. 11 is a flowchart illustrating an example of a registration process to the sorted-by-gate passenger information DB in the management server according to the first example embodiment.

FIG. 11 is a flowchart illustrating an example of a registration process to the sorted-by-gate passenger information DB 11d in the management server 10. This process is performed at the time an aircraft associated with a boarding gate departs from the airport DA, for example.

First, the management server 10 references the sorted-by-day passenger information DB 11c or a database (not illustrated) storing flight information of an aircraft and determines whether or not there is a flight for which the remaining time to an estimated time of departure is within a predetermined time (step S401).

Herein, if the management server 10 determines that there is a flight for which the remaining time to an estimated time of departure is within a predetermined time (step S401, YES), the process proceeds to step S402. In contrast, if the management server 10 determines that there is no flight for which the remaining time to an estimated time of departure is within a predetermined time (step S401, NO), the standby state is maintained.

In step S402, the management server 10 identifies a boarding gate that has been allocated to the flight of interest.

Next, the management server 10 acquires passenger information on the flight of interest from the sorted-by-day passenger information DB 11c (step S403). For example, the management server 10 acquires passenger information on all the passengers who are boarding the flight, NH03, scheduled to depart at 14:00.

The management server 10 then registers the passenger information acquired in step S403 to the sorted-by-gate passenger information DB 11d related to the boarding gate identified in step S402 (step S404) and ends the process.

[Update Process of Sorted-by-Gate Passenger Information DB 11d]

Figure 12:
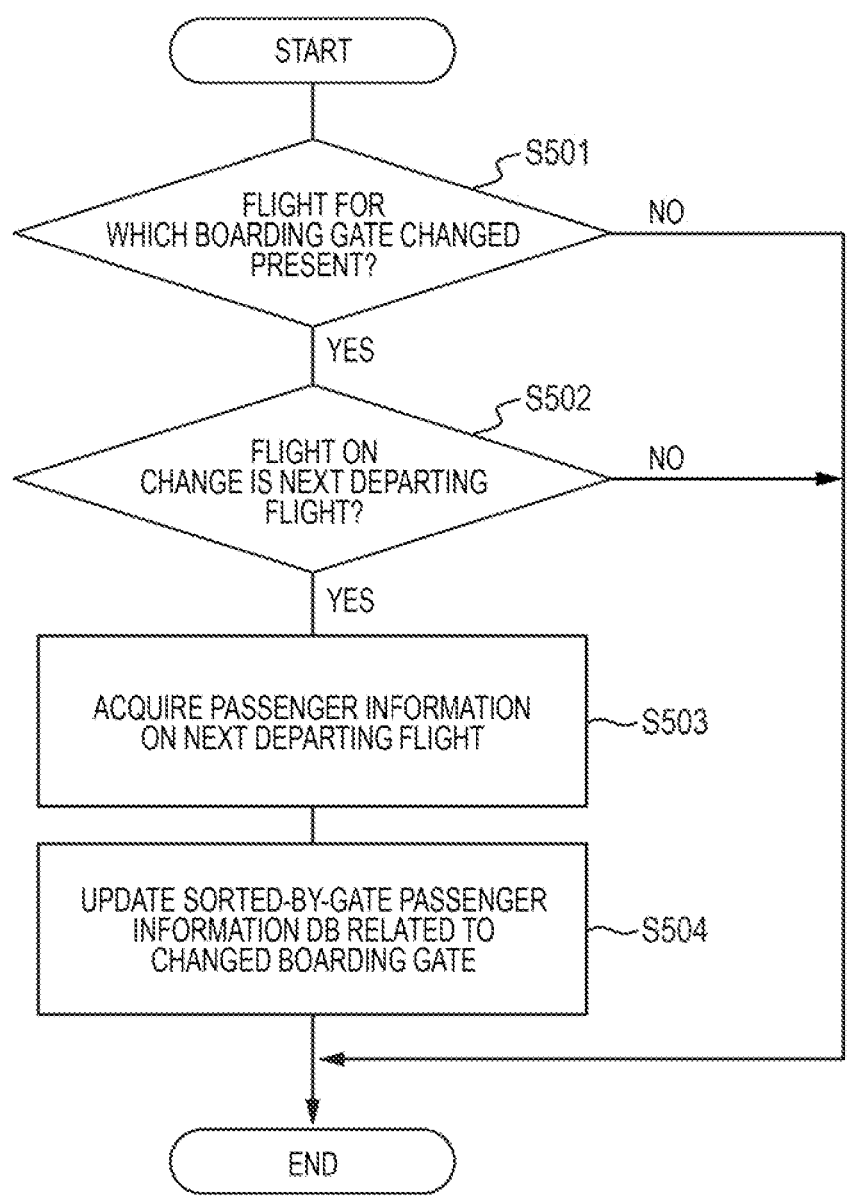
FIG. 12 is a flowchart illustrating an example of an update process of the sorted-by-gate passenger information DB in the management server according to the first example embodiment.

FIG. 12 is a flowchart illustrating an example of an update process of the sorted-by-gate passenger information DB 11d in the management server 10. This process is performed when a boarding gate stored in the sorted-by-day passenger information DB 11c has been changed, for example.

First, the management server 10 determines whether or not there is a flight for which the boarding gate has been changed in the sorted-by-day passenger information DB 11c (step S501).

Herein, if the management server 10 determines that there is a flight for which the boarding gate has been changed (step S501, YES), the process proceeds to step S502. In contrast, if the management server 10 determines that there is no flight for which the boarding gate has been changed (step S501, NO), the process ends.

In step S502, the management server 10 determines whether or not the flight for which the boarding gate has been changed is the flight next departing from the changed boarding gate.

Herein, if the management server 10 determines that the flight for which the boarding gate has been changed is the next departing flight (step S502, YES), the process proceeds to step S503. In contrast, if it is determined that the flight for which the boarding gate has been changed is not the next departing flight (step S502, NO), the process ends.

In step S503, from the sorted-by-day passenger information DB 11c, the management server 10 acquires passenger information related to the flight next departing from the changed boarding gate.

The management server 10 then updates the sorted-by-gate passenger information DB 11d related to the changed boarding gate in accordance with passenger information acquired in step S503 (step S504), and the process ends. In such a way, when a boarding gate corresponding to a certain flight has been changed, the sorted-by-gate passenger information DB 11d corresponding to the boarding gate is updated in turn.

[Identity Verification at Boarding Gate and Guide to Correct Boarding Gate]

Figure 13:
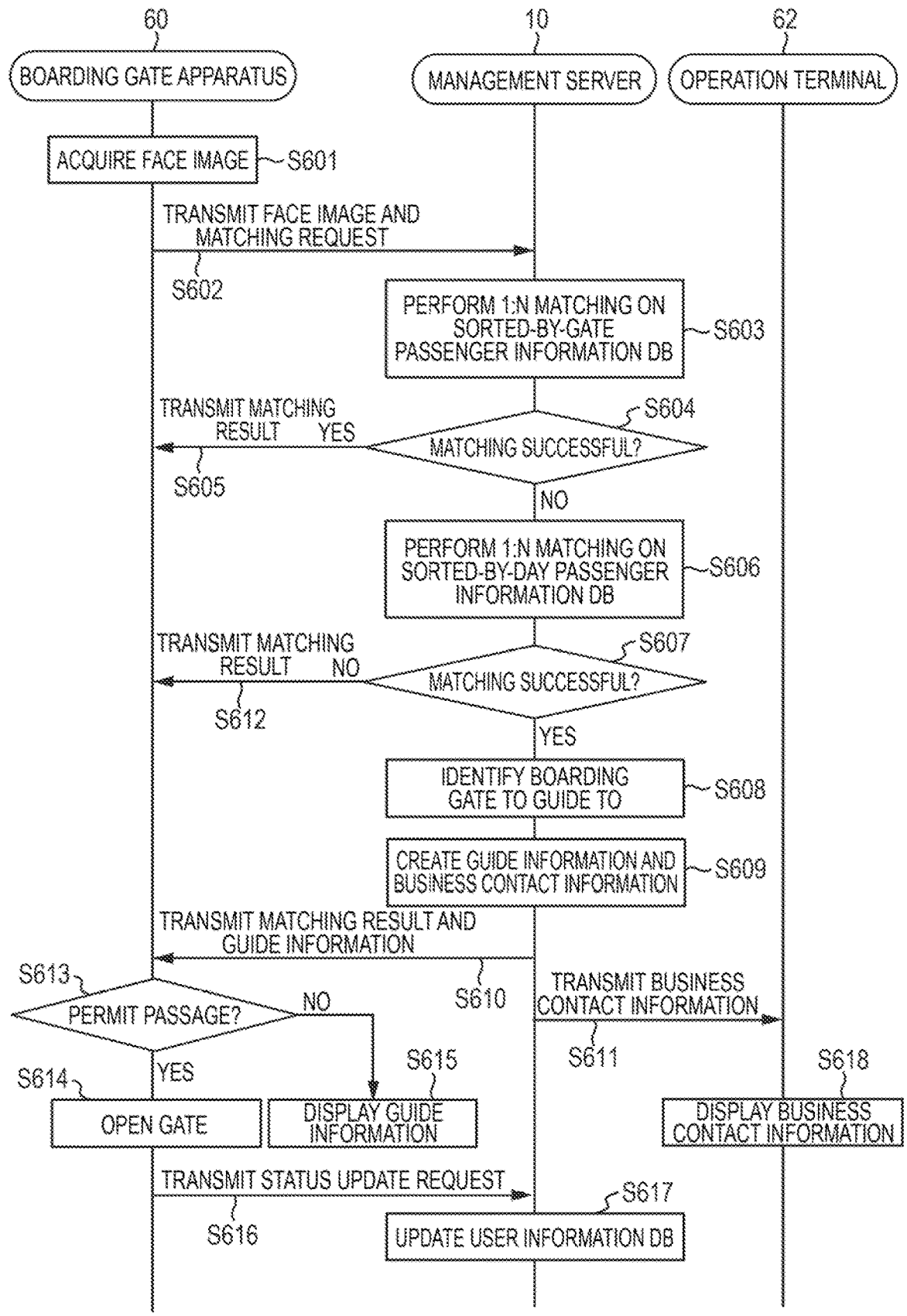
FIG. 13 is a sequence chart illustrating an example of a process in a boarding gate in the information processing system according to the first example embodiment.

FIG. 13 is a sequence chart illustrating an example of a process at a boarding gate of the information processing system 1. This process is performed when the user U tries to pass through a boarding gate.

First, the boarding gate apparatus 60 continuously or periodically captures images of an area in front of the boarding gate apparatus 60 by using the biometric information acquisition device 608 and acquires, as a target face image, a face image of the user U standing in front of the boarding gate apparatus 60 in a captured image (step S601).

Next, the boarding gate apparatus 60 transmits the target face image of the user U captured by the biometric information acquisition device 608 to the management server 10 together with a matching request (step S602). Accordingly, the boarding gate apparatus 60 requests the management server 10 to match the target face image of the user U captured by the biometric information acquisition device 608 with a plurality of registered face images registered in the database of the management server 10 in a one-to-N manner.

Next, in response to receiving the target face image and the matching request from the boarding gate apparatus 60, the management server 10 performs one-to-N matching between the target face image of the user U and registered face images stored in the sorted-by-gate passenger information DB 11d (step S603).

Next, the management server 10 determines whether or not the matching result of the matching process in step S603 is that the matching is successful (step S604).

Herein, if the management server 10 determines that the matching result is that the matching is successful (step S604, YES), the management server 10 transmits the matching result of the successful matching to the boarding gate apparatus 60 (step S605), and the process proceeds to step S613.

In contrast, if the management server 10 determines that the matching result is that the matching is unsuccessful (step S604, NO), the process proceeds to step S606.

In step S606, the management server 10 performs one-to-N matching between the target face image of the user U and the registered face image stored in the sorted-by-day passenger information DB 11c.

Next, the management server 10 determines whether or not the matching result of the matching process in step S606 is that the matching is successful (step S607).

Herein, if the management server 10 determines that the matching result is that the matching is successful (step S607, YES), the process proceeds to step S608.

In contrast, if the management server 10 determines that the matching result is that the matching is unsuccessful (step S607, NO), the management server 10 transmits the matching result of the unsuccessful matching to the boarding gate apparatus 60 (step S612), and the process proceeds to step S613.

In step S608, the management server 10 identifies a boarding gate to guide to, that is, a boarding gate available to the user U. Next, the management server 10 creates guide information for the user U and business contact information for the staff member S at another boarding gate, respectively (step S609).

Next, the management server 10 transmits the matching result and the guide information to the boarding gate apparatus 60 that has made the matching request (step S610). Further, the management server 10 transmits the business contact information to the operation terminal 62 corresponding to the boarding gate identified in step S608 (step S611). The process then proceeds to step S618.

In step S613, the boarding gate apparatus 60 determines whether or not to permit passage of the user U based on the matching result received from the management server 10.

Herein, if the boarding gate apparatus 60 determines to permit the passage of the user U (step S613, YES), the gate 610 is opened (step S614). The user U who has passed through the touch point P5 boards the aircraft. The process then proceeds to step S616.

In response, if the boarding gate apparatus 60 determines not to permit the passage of the user U (step S613, NO), the process proceeds to step S615.

In step S615, the boarding gate apparatus 60 displays the guide information received from the management server 10 on the display device 606 and ends the process.

Figure 14:
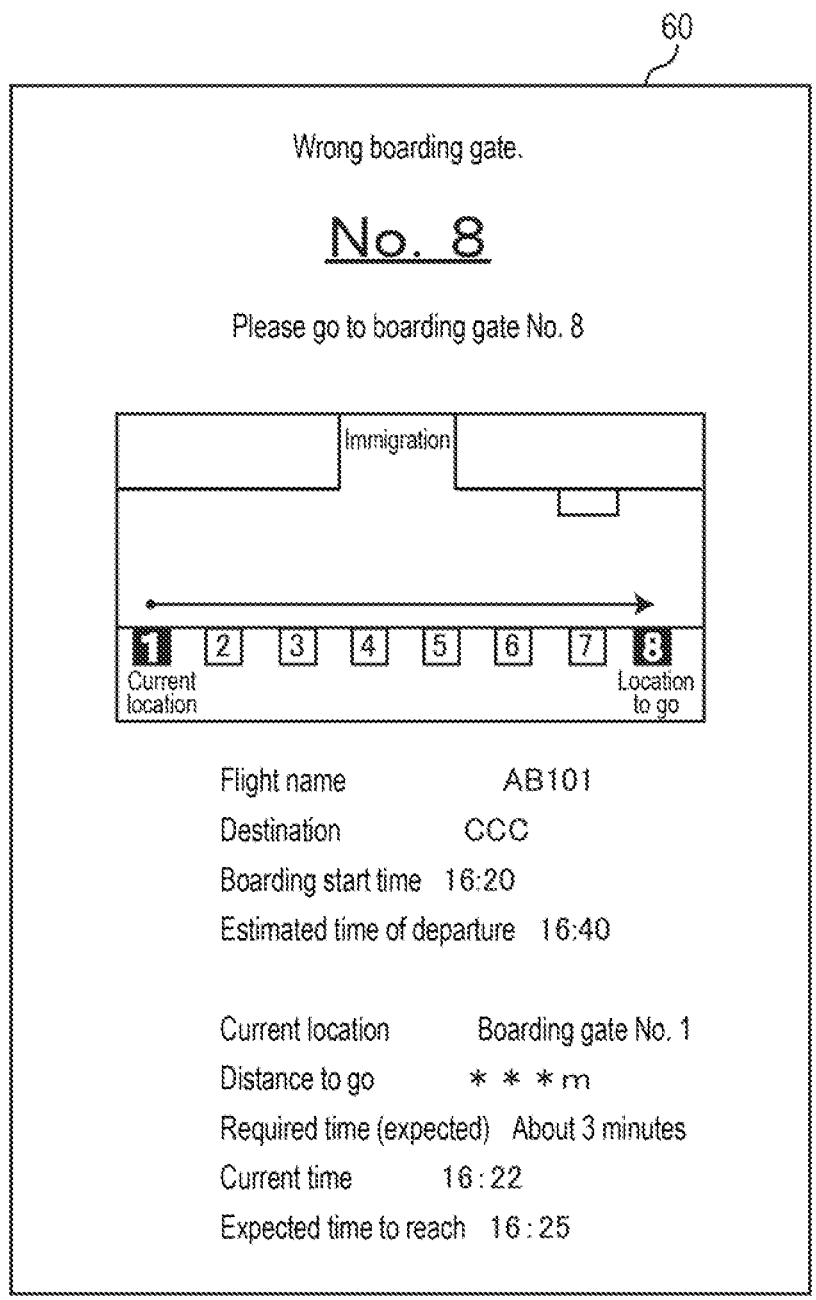
FIG. 14 is a diagram illustrating an example of a screen displayed on the boarding gate apparatus according to the first example embodiment.

FIG. 14 is a diagram illustrating an example of a screen displayed on the boarding gate apparatus 60. Illustrated herein is a guiding screen that displays a message ("Wrong boarding gate. Please go to boarding gate No. 8.") for guiding the user U to a correct boarding gate and a map indicating a positional relationship between a boarding gate where passage by the user U is refused (first gate) and a boarding gate that is available to the user U (second gate).

Further, in the screen of FIG. 14, flight information on the aircraft which the user U is boarding (flight name/destination/boarding start time/estimated time of departure) and information on the current location of the user U, a distance to go, an expected required time, the current time, and an expected time to reach are also displayed. The distance to go is acquired from a data table (not illustrated) storing positional relationships between boarding gates, for example. The required time is automatically calculated from the distance to go and an average human walking speed. The expected time to reach is calculated from the current time and the required time.

In step S616, the boarding gate apparatus 60 transmits a status update request related to the user U to the management server 10.

In response to receiving the status update request from the boarding gate apparatus 60, the management server 10 updates user information in the user information DB 11b for the user U (step S617) and ends the process. This may involve deletion of biometric information on the user U (registered face image).

In step S618, in response to receiving the business contact information from the management server 10, the operation terminal 62 displays the business contact information on the screen and ends the process.

Figure 15:
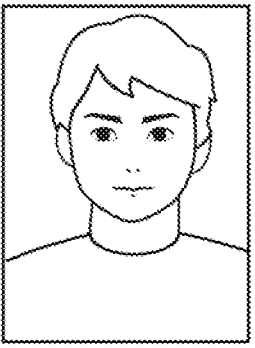
FIG. 15 is a diagram illustrating an example of a screen displayed on an operation terminal according to the first example embodiment.

FIG. 15 is a diagram illustrating an example of a screen displayed on the operation terminal 62. Illustrated herein is a business contact screen displayed on the operation terminal 62 installed on the correct boarding gate side when the user U tries to enter a wrong boarding gate. The business contact screen of FIG. 15 includes a business contact message ("There is a passenger who made a mistake in the boarding gate. To guide the passenger from the current location (boarding gate No. 1) to the boarding gate No. 8, please respond to the passenger when he arrives") and user information.

According to the present example embodiment, even when the user U tries to pass through a boarding gate that is different from a boarding gate available to the user U, it is possible to guide the user to the appropriate boarding gate. Further, a user who was refused to pass through a boarding gate is able to quickly determine which boarding gate to go to out of multiple boarding gates based on guide information provided by the present system. This improves user-friendliness for the user U using the airport DA and can contribute to smooth operation of aircrafts.

Second Example Embodiment

The information processing system 1 according to the present example embodiment will be described below. Note that references common to the references given in the drawings of the first example embodiment refer to the same objects. Description of the features common to those in the first example embodiment will be omitted, and different features will be described in detail.

The management server 10 of the present example embodiment differs from the first example embodiment in that the management server 10 further has a function of determining whether or not a boarding gate has been changed on a user U basis and a function of displaying change information on the boarding gate on a signage terminal 80 installed in a departure area of the airport DA.

Figure 16:
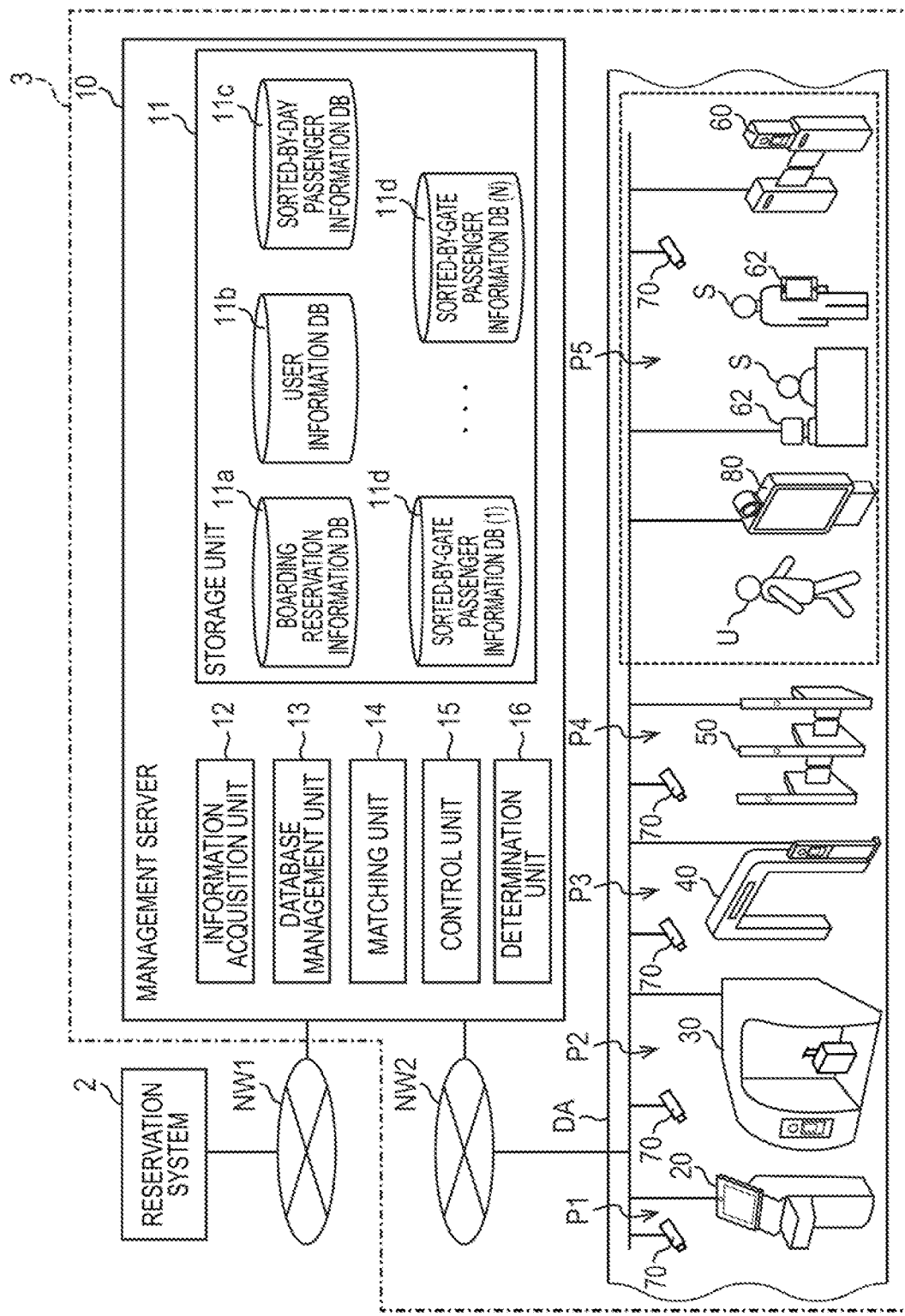
FIG. 16 is a schematic diagram illustrating an example of an overall configuration of an information processing system according to a second example embodiment.

FIG. 16 is a block diagram illustrating an example of an overall configuration of an information processing system 3 according to the present example embodiment. As illustrated in FIG. 16, the management server 10 of the present example embodiment is connected to the signage terminal 80 via the network NW2. The management server 10 matches a face image (biometric information) captured at the signage terminal 80 with registered face images stored in the user information DB 11b, respectively, and thereby performs identity verification as to whether or not the user U is a person who possesses the appropriate boarding ticket.

Further, the management server 10 further includes a determination unit 16 that determines whether or not a boarding gate for an aircraft scheduled for the user U to board has been changed. For example, the determination unit 16 compares a boarding gate, which was allocated at completion of the check-in procedure performed by the user U, with the latest boarding gate associated with an aircraft in the sorted-by-day passenger information DB 11c and determines whether or not there is a change in the boarding gate. The user information DB 11b of the present example embodiment includes, as the data items, a boarding gate ID indicating a boarding gate already allocated at completion of a check-in procedure to a flight to be used by the user U. Note that a scheme to determine whether or not there is a change in the boarding gate is not limited to the above.

Figure 17:
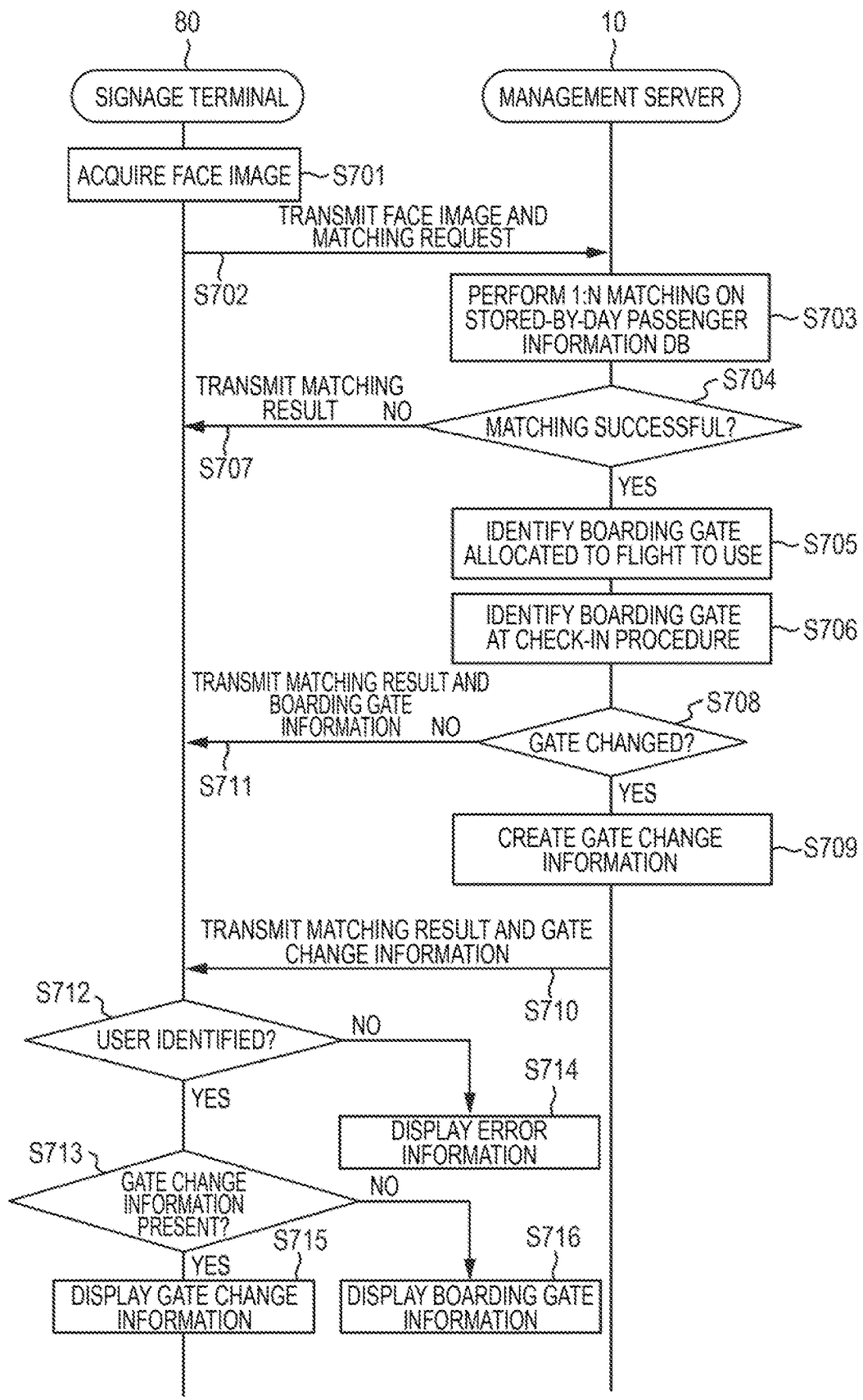
FIG. 17 is a sequence chart illustrating an example of a guide process to a boarding gate in the information processing system according to the second example embodiment.

FIG. 17 is a sequence chart indicating an example of a guide process in the information processing system 3. This process is performed when the user U is standing in front of the signage terminal 80, for example.

First, the signage terminal 80 continuously or periodically captures images of an area in front of the signage terminal 80 by biometric information acquisition device (not illustrated) and acquires, as a target face image, a face image of the user U standing in front of the signage terminal 80 in the captured image (step S701).

Next, the signage terminal 80 transmits the target face image of the user U to the management server 10 together with a matching request (step S702). Accordingly, the signage terminal 80 requests the management server 10 to match the captured target face image of the user U with a plurality of registered face images registered in the database in the management server 10 in a one-to-N manner.

Next, in response to receiving the target face image and the matching request from the signage terminal 80, the management server 10 performs one-to-N matching between the target face image of the user U and the registered face images stored in the sorted-by-day passenger information DB 11c (step S703).

Next, the management server 10 determines whether or not the matching result is that the matching is successful (step S704). Herein, if the management server 10 determines that the matching result is that the matching is successful (step S704, YES), the process proceeds to step S705.

In contrast, if the management server 10 determines that the matching result is that the matching is unsuccessful (step S704, NO), the management server 10 transmits a matching result of the unsuccessful matching to the signage terminal 80 (step S707), and the process proceeds to step S712.

In step S705, the management server 10 identifies a boarding gate already allocated to a flight to be used by the user U identified by the matching process. That is, a boarding gate available to the user U at the current time is identified.

Next, the management server 10 references the user information DB 11b and identifies the boarding gate already allocated at the completion of the check-in procedure for a flight scheduled for the user U to board (step S706). The process then proceeds to step S708.

In step S708, the management server 10 determines whether or not the boarding gate corresponding to the flight scheduled for the user U to board has been changed. Herein, if the management server 10 determines that the boarding gate has been changed (step S708, YES), the process proceeds to step S709.

In contrast, if the management server 10 determines that the boarding gate has not been changed (step S708, NO), the management server 10 transmits the matching result of the successful matching and the boarding gate information to the signage terminal 80 (step S711), and the process proceeds to step S712.

In step S709, the management server 10 creates gate change information. Next, the management server 10 transmits the matching result of the successful matching and the gate change information to the signage terminal 80 (step S710). The process then proceeds to step S712.

In step S712, in response to receiving the matching result from the management server 10, the signage terminal 80 determines whether or not the user U has been identified. Specifically, when the management server 10 matches the biometric information on the user U with the registered biometric information on N registrants R-1 to R-N stored in the user information DB 11b in a one-to-N manner and if the result of matching with the registrant R-x is that the matching is successful, the management server 10 outputs the matching result of the successful matching to the signage terminal 80. In such a case, the signage terminal 80 determines that the user U has been identified at the management server 10.

Further, when the management server 10 performs one-to-N matching between the biometric information on the user U and the registered biometric information on the registrants R-1 to R-N and if no matched person is present, the management server 10 outputs the matching result of the unsuccessful matching to the signage terminal 80. In such a case, the signage terminal 80 determines that the user U has not been identified at the management server 10.

Herein, if the signage terminal 80 determines that the user U has been identified at the management server 10 (step S712, YES), the process proceeds to step S713.

In contrast, if the signage terminal 80 determines that the user U has not been identified at the management server 10 (step S712, NO), the signage terminal 80 displays error information (step S714) and ends the process.

In step S713, the signage terminal 80 determines whether or not gate change information is included in the information received from the management server 10. Herein, if the signage terminal 80 determines that the gate change information is included (step S713, YES), the signage terminal 80 displays the gate change information (step S715) and ends the process.

In contrast, if the signage terminal 80 determines that no gate change information is included (step S713, NO), the signage terminal 80 displays the boarding gate information (step S716) and ends the process.

Figure 18:
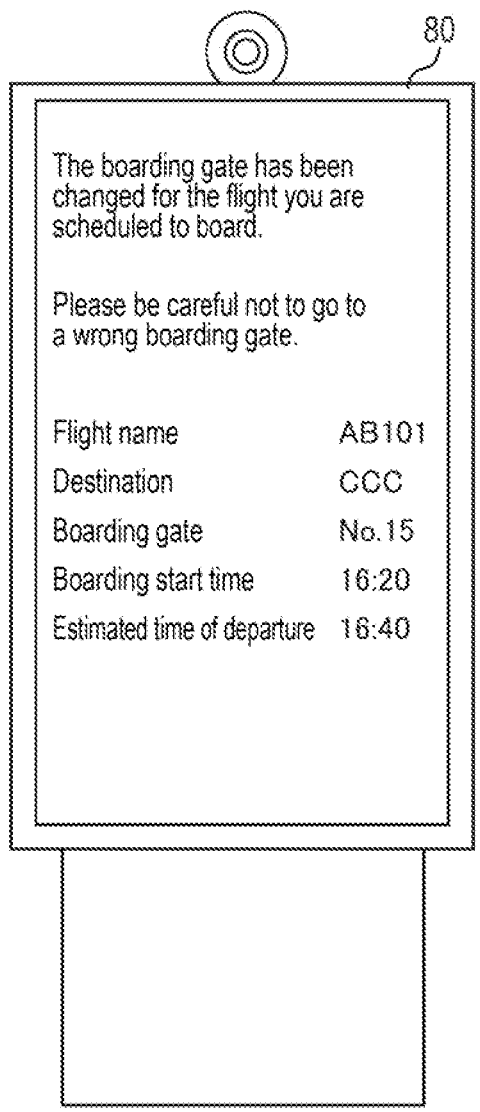
FIG. 18 is a diagram illustrating an example of illustrating an example of a screen displayed on a signage terminal according to the second example embodiment.

FIG. 18 is a diagram illustrating an example of a screen displayed on the signage terminal 80. Illustrated herein is a screen that displays a message that guides the user U authenticated by the management server 10 via the signage terminal 80 for the change of the boarding gate ("The boarding gate has been changed for the flight you are scheduled to board. Please be careful not to go to a wrong boarding gate.") and flight information on the aircraft scheduled for the user U to board (flight name/destination/boarding start time/estimated time of departure). Note that the information displayed on the signage terminal 80 is not limited to the above. For example, as with FIG. 14 described above, a map including a path from the current location to the changed boarding gate, the current time and the expected time to reach, or the like may also be displayed.

According to the present example embodiment, before moving to a boarding gate allocated to an aircraft scheduled for the user U to board, the user U is able to recognize that the boarding gate has been changed. This improves user-friendliness for the user U using the airport DA and can contribute to smooth operation of aircrafts.

Third Example Embodiment

Figure 19:
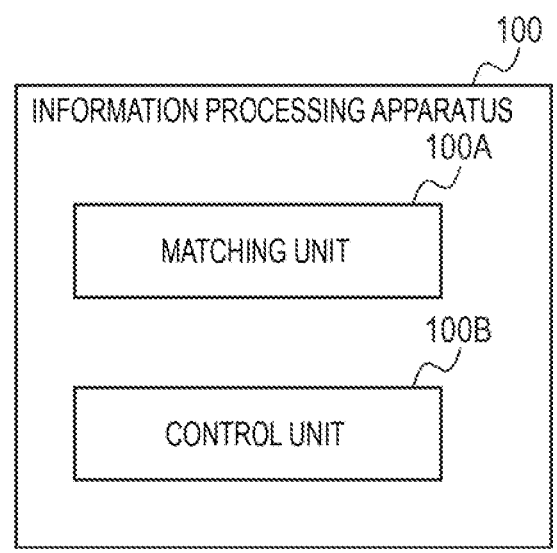
FIG. 19 is a function block diagram of an information processing apparatus according to a third example embodiment.

FIG. 19 is a function block diagram of an information processing apparatus according to the present example embodiment. The information processing apparatus 100 includes a matching unit 100A and a control unit 100B. The matching unit 100A has a first mode to match biometric information on a user acquired at a first gate of a plurality of boarding gates with a first group of registered biometric information on an expected passenger related to the first gate and a second mode to match the biometric information with a second group of registered biometric information on all expected passengers related to the plurality of boarding gates. When a matching result in the first mode is that the matching is successful, the control unit 100B permits the user to pass through the first gate, and when a matching result in the second mode is that the matching is successful, the control unit 100B outputs guide information that guides the user to a second gate associated with registered biometric information which successfully matches the biometric information out of the second group of registered biometric information.

According to the present example embodiment, the information processing apparatus 100 that can guide the user to the appropriate boarding gate is provided.

Fourth Example Embodiment

Figure 20:
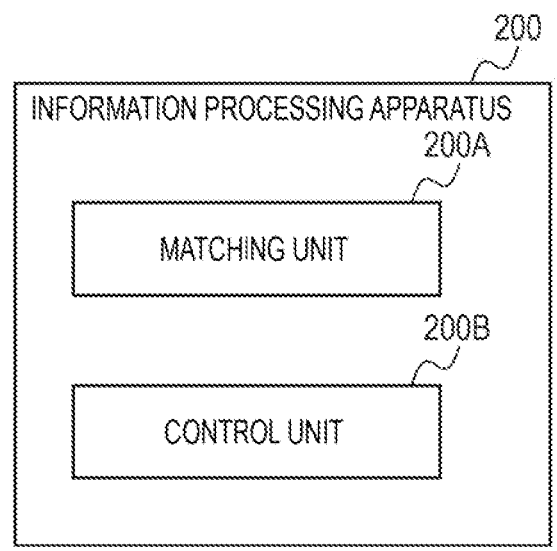
FIG. 20 is a function block diagram of an information processing apparatus according to a fourth example embodiment.

FIG. 20 is a block diagram illustrating the function of an information processing apparatus according to the present example embodiment. The information processing apparatus 200 includes a matching unit 200A and a control unit 200B. The matching unit 200A matches biometric information on a user acquired by a display terminal with registered biometric information related to a person boarding a vehicle from a boarding gate. The control unit 200B causes the display terminal to display information indicating a change of a boarding gate when change information on the boarding gate is associated with registered biometric information with which a result of matching of the biometric information is that the matching is successful.

According to the present example embodiment, the information processing apparatus 200 that can guide the user to the appropriate boarding gate is provided.

Modified Example Embodiment

Although the present invention has been described above with reference to the example embodiments, the present invention is not limited to the example embodiments described above. Various modifications that can be understood by those skilled in the art can be made to the configuration and details of the present invention within the scope not departing from the spirit of the present invention. For example, it should be understood that an example embodiment in which a configuration of a part of any of the example embodiments is added to another example embodiment or an example embodiment in which a configuration of a part of any of the example embodiments is replaced with a configuration of a part of another example embodiment is also an example embodiment to which the present invention may be applied.

Further, although the entity to be notified of change information on a boarding gate is limited to the apparatus installed in the airport in the example embodiments described above, the entity to be notified is not limited thereto. For example, the example embodiment may be configured such that a contact address of a user terminal possessed by the user U is associated with boarding reservation information on the user U in advance and thereby the user terminal is notified of change information on a boarding gate.

Further, although the configuration in which the mode to perform a matching process is automatically switched has been described in the above example embodiments, the way of switching is not limited thereto. The management server 10 may be configured to set the mode to perform a matching process in the management server 10 (the matching unit 14) to one of the first mode and the second mode based on an external input operation in the boarding gate apparatus 60. That is, in accordance with a manual operation of the staff member S, the database with which a face image of the user U is matched can be set to one of the sorted-by-gate passenger information DB 11*d* and the sorted-by-day passenger information DB 11*c*.

Further, the example embodiment may be configured so that an administrator such as the staff member S or the user U can externally confirm whether a matching process is performed in the first mode or the second mode. Specifically, it is preferable to configure the example embodiment so that a screen display during a matching process in the first mode and a screen display during a matching process in the second mode can be changed. For example, a message such as "Matching with expected passengers for flight number \*\*\* is ongoing", "Matching with today's expected passengers is ongoing", or the like may be displayed on the screen of the boarding gate apparatus 60. Further, if the matching result in the first mode is that the matching is unsuccessful, a message such as "Please wait for a while", for example, may be displayed on the screen of the boarding gate apparatus 60.

Further, attribute information on the user U may be acquired in accordance with a process of matching between biometric information on the user U and registered biometric information registered in a database, and the acquired attribute information may be utilized in providing guide information. For example, the example embodiment may be configured such that a displayed language of the guide information is changed to the native language of the user U.

When nationality information on the user is further associated with a registered face image (registered biometric information) included in the sorted-by-gate passenger information DB 11*d* (the first group of registered biometric information) and the sorted-by-day passenger information DB 11*c* (the second group of registered biometric information), respectively, the management server 10 may be configured to change the displayed language of guide information based on the nationality information on the user U associated with the registered biometric information.

Further, although the case where guide information to the user U is displayed on a screen has been described in the above example embodiment, the way of providing guide information is not limited thereto. For example, the management server 10 may generate print data for outputting guide information on a paper medium.

Further, the camera 70 illustrated in FIG. 1 and FIG. 16 may be provided to the apparatus at respective touch points P1 to P5 (the check-in terminal 20, the automatic baggage check-in machine 30, the security inspection apparatus 40, the automated gate apparatus 50, the boarding gate apparatus 60).

Further, when a plurality of users (passengers) U made a mistake in the boarding gate, the total number thereof may be displayed on the screen. Furthermore, the example embodiment may be configured such that a selection button such as a tab is provided in a screen displaying the total number of users U who made a mistake in the boarding gate so that an administrator is able to select information on each user U as illustrated in FIG. 15.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments also includes an example embodiment that operates on OS to perform a process in cooperation with another software or a function of an add-in board without being limited to an example embodiment that performs a process by an individual program stored in the storage medium.

The whole or part of the example embodiments disclosed above can be described as, but not limited to, the following supplementary notes.

(Supplementary Note 1)

An information processing apparatus comprising:
a matching unit that performs at least one of matching processes performed in a first mode, which is to match biometric information on the user acquired at a first gate of a plurality of boarding gates with a first group of registered biometric information on an expected passenger related to the first gate, and a second mode, which is to match the biometric information with a second group of registered biometric information on all the expected passengers related to the plurality of boarding gates; and
a control unit that, when a matching result in the first mode is that the matching is successful, permits the user to pass through the first gate, and when a matching result in the second mode is that the matching is successful, outputs guide information that guides the user to a second gate associated with registered biometric information which successfully matches the biometric information out of the second group of registered biometric information.

(Supplementary Note 2)

The information processing apparatus according to supplementary note 1, wherein the control unit causes the matching unit to perform a matching process in the second mode when the matching result in the first mode is that the matching is not successful.

(Supplementary Note 3)

The information processing apparatus according to supplementary note 1, wherein the control unit sets a mode of performing a matching process at the matching unit to one of the first mode and the second mode based on an external input operation.

(Supplementary Note 4)

The information processing apparatus according to any one of supplementary notes 1 to 3, wherein the control unit outputs, to an operation terminal associated with the second gate, information on the user who was refused to pass through the first gate.

(Supplementary Note 5)

The information processing apparatus according to supplementary note 4, wherein the information includes the biometric information on the user.

(Supplementary Note 6)

The information processing apparatus according to any one of supplementary notes 1 to 5, wherein the guide information includes map information indicating at least a positional relationship between the first gate and the second gate.

(Supplementary Note 7)

The information processing apparatus according to any one of supplementary notes 1 to 6, wherein the guide information includes information on a required time when a user moves from the first gate to the second gate.

(Supplementary Note 8)

The information processing apparatus according to any one of supplementary notes 1 to 7, wherein the guide information includes path information from the first gate to the second gate.

(Supplementary Note 9)

The information processing apparatus according to any one of supplementary notes 1 to 8, wherein the guide information includes information on a boarding start time at the second gate.

(Supplementary Note 10)

The information processing apparatus according to any one of supplementary notes 1 to 9,
wherein nationality information on the user is further associated with the registered biometric information included in the first group of registered biometric information and the second group of registered biometric information, respectively, and
wherein the control unit changes displayed language of the guide information based on the nationality information associated with the registered biometric information with which a result of matching of the biometric information is that the matching is successful.

(Supplementary Note 11)
The information processing apparatus according to any one of supplementary notes 1 to 10, wherein the control unit generates display data that causes the guide information to be displayed on a screen.

(Supplementary Note 12)
The information processing apparatus according to any one of supplementary notes 1 to 11, wherein the control unit generates print data that causes the guide information to be output on a paper medium.

(Supplementary Note 13)
The information processing apparatus according to any one of supplementary notes 1 to 12, wherein the biometric information is a face image.

(Supplementary Note 14)
An information processing method comprising:
performing at least one of matching processes performed in a first mode, which is to match biometric information on the user acquired at a first gate of a plurality of boarding gates with a first group of registered biometric information on an expected passenger related to the first gate, and a second mode, which is to match the biometric information with a second group of registered biometric information on all the expected passengers related to the plurality of boarding gates; and
when a matching result in the first mode is that the matching is successful, permitting the user to pass through the first gate, and when a matching result in the second mode is that the matching is successful, outputting guide information that guides the user to a second gate associated with registered biometric information which successfully matches the biometric information out of the second group of registered biometric information.

(Supplementary Note 15)
A storage medium storing a program that causes a computer to perform:
performing at least one of matching processes performed in a first mode, which is to match biometric information on the user acquired at a first gate of a plurality of boarding gates with a first group of registered biometric information on an expected passenger related to the first gate, and a second mode, which is to match the biometric information with a second group of registered biometric information on all the expected passengers related to the plurality of boarding gates; and
when a matching result in the first mode is that the matching is successful, permitting the user to pass through the first gate, and when a matching result in the second mode is that the matching is successful, outputting guide information that guides the user to a second gate associated with registered biometric information which successfully matches the biometric information out of the second group of registered biometric information.

(Supplementary Note 16)
An information processing apparatus comprising:
a matching unit that matches biometric information on a user acquired by a display terminal with registered biometric information related to a person boarding a vehicle from a boarding gate; and
a control unit that causes the display terminal to display information indicating a change of the boarding gate when change information on the boarding gate is associated with the registered biometric information with which a result of matching of the biometric information is that the matching is successful.

REFERENCE SIGNS LIST

NW1, NW2 network
U user
S staff member
1, 3 information processing system
10 management server
11 storage unit
11a boarding reservation information DB
11b user information DB
11c sorted-by-day passenger information DB
11d sorted-by-gate passenger information DB
12 information acquisition unit
13 database management unit
14 matching unit
15 control unit
16 determination unit
20 check-in terminal
30 automatic baggage check-in machine
40 security inspection apparatus
50 automated gate apparatus
60 boarding gate apparatus
62 operation terminal
70 camera
80 signage terminal

What is claimed is:

1. An information processing apparatus comprising:
at least one memory storing instructions; and
at least one processor configured to execute the instructions to:
perform a first mode to match biometric information on a user acquired at a first gate of a plurality of boarding gates with a first group of registered biometric information on an expected passenger related to the first gate
perform a second mode to match the biometric information with a second group of registered biometric information on all expected passengers related to the plurality of boarding gates; and
when a matching result in the first mode is that the matching is successful, permit the user to pass through the first gate, when the matching result in the first mode is that the matching is not successful, perform a matching process in the second mode, and when a matching result in the second mode is that the matching is successful, output guide information that guides the user to a second gate associated with registered biometric information which successfully matches the biometric information out of the second group of registered biometric information.

2. The information processing apparatus according to claim 1, wherein the at least one processor is further configured to execute the instructions to:
set a mode of performing a matching process to one of the first mode and the second mode based on an external input operation.

3. The information processing apparatus according to claim 1, wherein the at least one processor is further configured to execute the instructions to:
output, to an operation terminal associated with the second gate, information on the user who was refused to pass through the first gate.

4. The information processing apparatus according to claim 3, wherein the information includes the biometric information on the user.

5. The information processing apparatus according to claim 1, wherein the guide information includes map information indicating at least a positional relationship between the first gate and the second gate.

6. The information processing apparatus according to claim 1, wherein the guide information includes information on a required time when a user moves from the first gate to the second gate.

7. The information processing apparatus according to claim 1, wherein the guide information includes path information from the first gate to the second gate.

8. The information processing apparatus according to claim 1, wherein the guide information includes information on a boarding start time at the second gate.

9. The information processing apparatus according to claim 1,
wherein nationality information on the user is further associated with the registered biometric information included in the first group of registered biometric information and the second group of registered biometric information, respectively, and
wherein the at least one processor is further configured to execute the instructions to:
change displayed language of the guide information based on the nationality information associated with the registered biometric information with which a result of matching of the biometric information is that the matching is successful.

10. The information processing apparatus according to claim 1, wherein the at least one processor is further configured to execute the instructions to:
generate display data that causes the guide information to be displayed on a screen.

11. The information processing apparatus according to claim 1, wherein the at least one processor is further configured to execute the instructions to:
generate print data that causes the guide information to be output on a paper medium.

12. The information processing apparatus according to claim 1, wherein the biometric information is a face image.

13. An information processing method comprising:
performing a first mode to match biometric information on a user acquired at a first gate of a plurality of boarding gates with a first group of registered biometric information on an expected passenger related to the first gate;
performing a second mode to match the biometric information with a second group of registered biometric information on all expected passengers related to the plurality of boarding gates; and
when a matching result in the first mode is that the matching is successful, permitting the user to pass through the first gate, when the matching result in the first mode is that the matching is not successful, performing a matching process in the second mode, and when a matching result in the second mode is that the matching is successful, outputting guide information that guides the user to a second gate associated with registered biometric information which successfully matches the biometric information out of the second group of registered biometric information.

14. A non-transitory storage medium storing a program that causes a computer to perform:
performing a first mode to match biometric information on a user acquired at a first gate of a plurality of boarding gates with a first group of registered biometric information on an expected passenger related to the first gate;
performing a second mode to match the biometric information with a second group of registered biometric information on all expected passengers related to the plurality of boarding gates; and
when a matching result in the first mode is that the matching is successful, permitting the user to pass through the first gate, when the matching result in the first mode is that the matching is not successful, performing a matching process in the second mode, and when a matching result in the second mode is that the matching is successful, outputting guide information that guides the user to a second gate associated with registered biometric information which successfully matches the biometric information out of the second group of registered biometric information.

15. An information processing apparatus comprising:
at least one memory storing instructions; and
at least one processor configured to execute the instructions to:
match biometric information on a user acquired by a display terminal with registered biometric information related to a person boarding a vehicle from a boarding gate; and
cause the display terminal to display information indicating a change of the boarding gate when change information on the boarding gate is associated with the registered biometric information with which a result of matching of the biometric information is that the matching is successful.

* * * * *